United States Patent
Lu

(10) Patent No.: US 6,447,140 B1
(45) Date of Patent: Sep. 10, 2002

(54) HANDHELD PERSONAL AID

(76) Inventor: Clive S. Lu, 282 Newbridge Rd., Hicksville, NY (US) 11801

( * ) Notice: Subject to any disclaimer, the term of this patent is extended or adjusted under 35 U.S.C. 154(b) by 0 days.

(21) Appl. No.: 09/783,040

(22) Filed: Feb. 15, 2001

(51) Int. Cl.[7] .................... F21V 33/00; F21W 111/10
(52) U.S. Cl. ................. 362/109; 362/154; 362/253; 235/486; 235/487
(58) Field of Search ................ 362/109, 154, 362/156, 253; 235/486, 487, 492

(56) References Cited

U.S. PATENT DOCUMENTS

| | | | |
|---|---|---|---|
| 4,213,035 A | | 7/1980 | Washizuka et al. .... 235/92 DN |
| 4,670,853 A | | 6/1987 | Stepien ..................... 364/70 S |
| 4,843,223 A | * | 6/1989 | Shino .......................... 235/487 |
| 5,015,830 A | * | 5/1991 | Masuzawa et al. ......... 235/486 |
| 5,276,317 A | * | 1/1994 | Ozouf ......................... 235/486 |
| 5,402,095 A | * | 3/1995 | Janniere ..................... 235/486 |
| 5,490,039 A | | 2/1996 | Helms ........................ 361/683 |
| 5,560,476 A | | 10/1996 | Lee ............................... 206/38 |
| 5,670,769 A | * | 9/1997 | Pernet ........................ 235/487 |
| 5,675,524 A | | 10/1997 | Bernard ................. 364/705.05 |
| 5,806,670 A | | 9/1998 | Harlan et al. ................ 206/232 |
| 5,811,770 A | * | 9/1998 | Bonnemoy ................... 235/380 |
| 6,026,873 A | * | 2/2000 | Van Geer .................... 150/147 |
| 6,040,829 A | * | 3/2000 | Cory et al. .................. 345/327 |
| 6,089,459 A | * | 7/2000 | Eisele et al. ................. 235/492 |
| 6,097,606 A | | 8/2000 | Groves et al. .............. 361/747 |
| 6,108,640 A | * | 8/2000 | Slotznick ...................... 705/26 |
| 6,259,769 B1 | * | 7/2001 | Page et al. ..................... 379/58 |

FOREIGN PATENT DOCUMENTS

| | | | | |
|---|---|---|---|---|
| JP | 2000113091 | * | 4/2000 | |
| WO | WO 91/12593 | * | 8/1991 | ................. 235/492 |
| WO | WO 01/67374 | * | 9/2001 | |

* cited by examiner

Primary Examiner—Alan Cariaso
(74) Attorney, Agent, or Firm—Welsh & Flaxman LLC

(57) ABSTRACT

A personal aid including a handheld housing sized to be readily carried by a user. The housing includes a storage compartment comprising an enclosure shaped and dimensioned for the selective placement of an article therein and a closure positioned adjacent the enclosure for selectively covering the enclosure so as to maintain an article therein. An electronic assistant is integrated with the housing. The electronic assistant is linked to a smart card holder in which a smart card is positioned to provide functionality to the electronic assistant.

20 Claims, 2 Drawing Sheets

HANDHELD PERSONAL AID

BACKGROUND OF THE INVENTION

1. Field of the Invention

The invention relates to a handheld personal aid. More particularly, the invention relates to a personal aid combining a carrying case with a personal digital assistant.

2. Description of the Prior Art

While the advent of personal digital assistants, and other portable, handheld electronic devices have simplified the manner in which we transmit, carry and transfer information, these devices have added to the number of objects which we carry with us as we go about our daily routine. For example, in addition to the personal digital assistant storing a vast amount of information, people must still carry medicine, cosmetics, credit cards, various "smart cards" etc.

Unfortunately, the many items we carry with us on a daily basis necessitate the use of a carrying case of some sort to keep all of the items readily accessible. As a result, the electronic devices originally developed to simplify our lives have in fact only added to the many objects we already must keep with us on a daily basis.

With this in mind, a need exists for a convenient way in which to carry the many items we use on a daily basis. The present invention provides such a device.

SUMMARY OF THE INVENTION

It is, therefore, an object of the present invention to provide a personal aid including a handheld housing sized to be readily carried by a user. The housing includes a storage compartment comprising an enclosure shaped and dimensioned for the selective placement of an article therein and a closure positioned adjacent the enclosure for selectively covering the enclosure so as to maintain an article therein. An electronic assistant is integrated with the housing. The electronic assistant is linked to a smart card holder in which a smart card is positioned to provide functionality to the electronic assistant.

It is also an object of the present invention to provide a personal aid wherein the electronic assistant includes means for providing a light.

It is a further object of the present invention to provide a personal aid wherein the electronic assistant includes an infrared transmitter and receiver.

It is another object of the present invention to provide a personal aid including a speaker positioned within the housing and coupled to the electronic assistant, wherein the electronic assistant include means for driving speaker.

It is still a further object of the present invention to provide a personal aid including a container for selectively positioning within the storage compartment.

It is also another object of the present invention to provide a personal aid wherein the smart card is selectively positioned within the smart card holder.

It is yet another object of the present invention to provide a personal aid wherein the smart card holder rotates between an secured, closed position and an unsecured, receiving position.

It is also an object of the present invention to provide a personal aid wherein the smart card holder includes a cover.

It is a further object of the present invention to provide a personal aid wherein the electronic assistant includes a plurality of switches controlling operation thereof.

It is another object of the present invention to provide a personal aid wherein the electronic assistant includes four switches.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
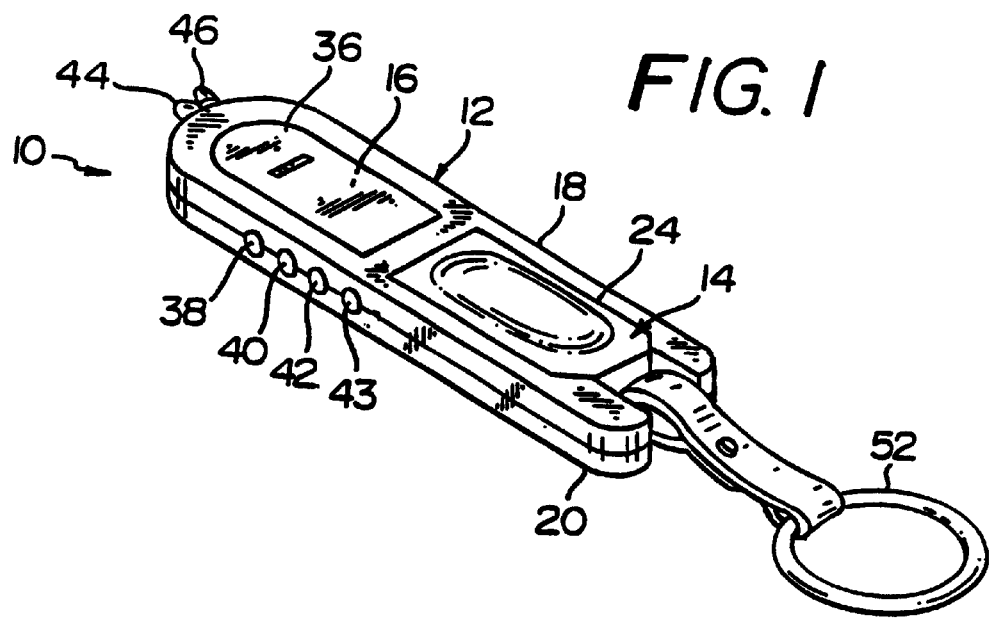
FIG. 1 is a perspective view of the personal aid with the smart card holder in a closed position.
Figure 2:
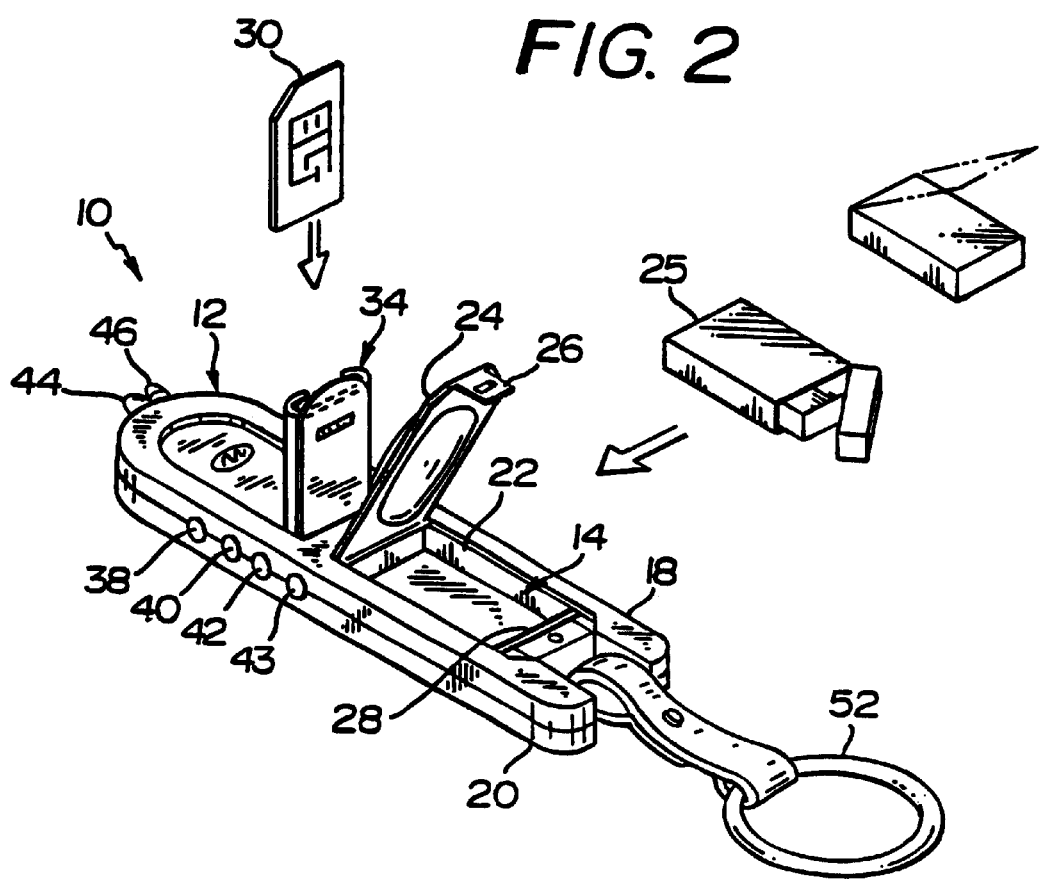
FIG. 2 is a perspective view of the personal aid with the smart card holder and compartment in opened positions.
Figure 3:
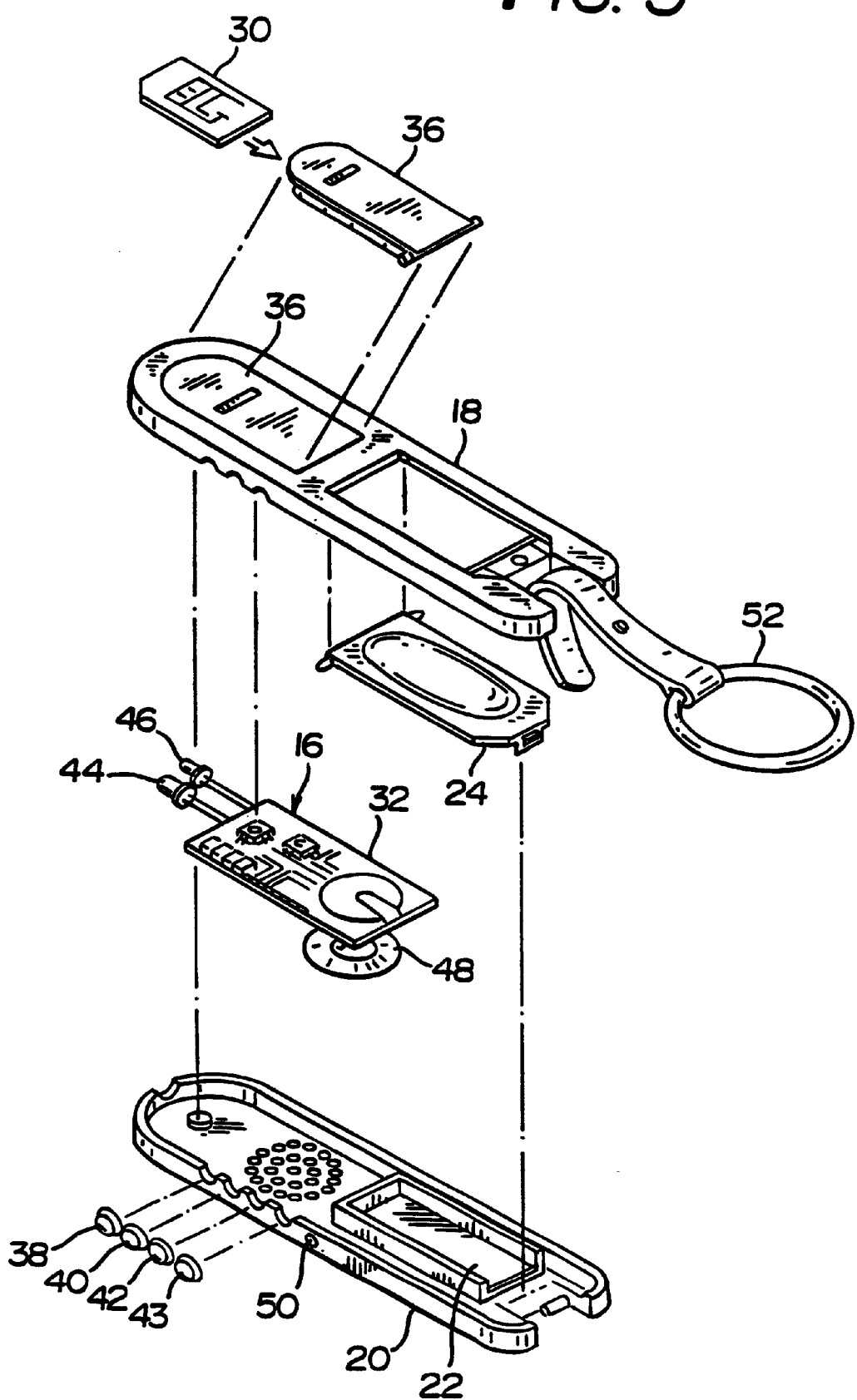
FIG. 3 is an exploded view of the present personal aid.

With reference to FIG. 1, a handheld personal aid 10 in accordance with the present invention is disclosed. The personal aid 10 generally includes a handheld housing 12 sized to be readily carried by a user. The housing 12 includes a storage compartment 14. The handheld personal aid 10 further includes an electronic assistant 16 integrated with the housing 12. The housing 12 may also be provided with accessories, such as, a key chain holder 52.

The housing 12 is preferably formed from upper and lower halves 18, 20 bound together using conventional manufacturing techniques. With this in mind, the upper and lower halves 18, 20 of the housing 12 are manufactured from high impact plastic, although other materials may be used without departing from the spirit of the present invention.

With reference to the storage compartment 14, the compartment 14 includes an enclosure 22 shaped and dimensioned for the placement of various articles therein. For example, the enclosure 22 is shaped to receive articles such as, but not limited to, lipstick, medicine containers, eyeshadow, keys etc. which ray be stored in a container 25. The enclosure 22 is formed by creating a recess 60 in the lower half 20 of the housing. The recess 60 includes upstanding sidewalls 62, a bottom wall 64 and an open top 66. The storage compartment 14 is further provided with a closure 24 shaped and dimensioned to securely cover the enclosure 22 for the safe storage of articles therein. The closure 24 is hinged to the upper half 18 of the housing 12 for selective closure of the enclosure 22. With this in mind, the closure 24 is provided with a latch 26 which engages a mating latch 28 on the upper half 18 of the closure 24 for ensuring the secure closure of the storage compartment 14.

The electronic assistant 16 works in conjunction with a selectively replaceable smart card 30 to bring electronic functionality to the present handheld personal aid 10. Specifically, the electronic assistant 16 is composed of a printed circuit board 32 stored within the housing 12 between the upper and lower halves 18, 20 thereof. The smart card 30 is housed within a smart card holder 34 built into the upper half 18 of the housing 12. The smart card holder 34 rotates between an unsecured/receiving position and an secured/closed position. The positioning of the smart card holder 34 locks and unlocks the smart card 30 in contacted position. The system may then be actuated by activating one of the first, second, third or fourth switchs 38, 40, 42, 43. In order to ensure that the smart card 30 is not damaged as an individual uses the handheld personal aid 10, the smart card holder 34 is provided with a cover 36 that is selectively closed to securely seal a smart card 30 within the smart card holder 34.

The smart card holder 34, and ultimately the smart card 30, are electrically coupled to the printed circuit board 32. In this way, the smart card 30 and the printed circuit board 32 work together to provide desired functionality to the handheld personal aid 10. Specifically, and as those skilled in the art will certainly appreciate, a smart card 30 is a credit card sized plastic card embedded with an integrated circuit chip making it "smart". Smart cards can store several hundred times more data than a conventional card with a magnetic stripe. The information and/or applications stored in the integrated circuit chip of the smart card are transferred through an electronic module that interconnects with a terminal or card reader. In accordance with the present invention, the smart card interconnects with the printed circuit board to reveal the functionality thereof.

In accordance with alternate embodiments, a contactless smart card may be utilized. A contactless smart card has an antenna coil which communicates with a receiving antenna to transfer information between the integrated circuit chip of the smart card and the unit processing the information. In addition, and depending upon the type of embedded chip, smart cards can be either memory cards or processor cards.

Memory cards hold information thousands of times greater than a magnetic stripe card. Although these cards hold vast quantities of information, their functions are limited to basic applications such as phone cards. In contrast, processor cards contain a full-fledge microprocessor on board and can function as a processor device offering multiple functions, such as, encryption, advance security mechanisms, local data processing, conflict calculations and other interactive processes. Most stored-value cards integrated with identification, security and information purposes are processor cards. Only processor cards are truly smart enough to offer the flexibility and multi-functionality desired in the networked economy.

In addition to those cards commonly referred to as "smart cards", PC cards may also be used in accordance with the present invention and are for the purposes of the present specification considered to be "smart cards". PC cards (also known as PCMCIA cards) have the same characteristics as smart cards but are used as peripheral devices such as modems or game cartridges. PC cards are generally extension devices for other processing units and function without personalization.

Regardless of the smart card 30 used in conjunction with the present handheld personal aid 10, the smart card 30 integrates with the printed circuit board 32 to bring functionality to the present invention. For example, the smart card 30 may permit the handheld personal aid 10 to function as an infrared remote by inserting an appropriate smart card 30 in the smart card holder 34 and activating one of the first, second, third or fourth switches 38, 40, 42, 43 to transmit an infrared signal via an emitter 44 positioned at the forward end of the housing 12.

Similarly, various smart cards 30 may be employed offering functionality to the handheld personal aid 10 as an SOS flash signal operated by actuating one of the first, second, third or fourth switches 38, 40, 42, 43 to light a LED 46 located at the forward portion of the housing 12. In addition, smart cards 30 may be employed which offer the ability to provide emergency transmission to a proper party. This is achieved by activating one of the first, second, third or fourth switches 38, 40, 42, 43 to begin transmission via cellular technology, RF technology or IR technology.

In addition, the smart card 30 may provide audio functions to the handheld personal aid 10. The audio functions are achieved by the integration of the smart card 30 and the printed circuit board 32 controlled by the first, second, third and/or fourth switches 38, 40, 42, 43, and output via a speaker 48 or external speaker output 50 linked to the printed circuit board 32.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A personal aid, comprising:

a handheld housing sized to be readily carried by a user, the housing being formed of a rigid molded material;

the housing including a rigid storage compartment separate and distinct from all electronic component making up the personal aid, the storage compartments consisting essentially of an enclosure shaped and dimensioned for the selective placement of an article therein, wherein the enclosure comprises a recess formed in the housing, the recess consisting essentially of a bottom wall, upstanding sidewalls and an open top;

a rigid closure positioned adjacent the enclosure for selectively covering the recess so as to maintain an article therein;

a smart card holder formed with the housing; and an electronic assistant integrated with the housing, the electronic assistant being linked to the smart card holder in which smart card is positioned to provide functionality to the electronic assistant.

2. The personal aid according to claim 1, wherein the electronic assistant includes means for providing a light.

3. The personal aid according to claim 1, wherein the electronic assistant includes an infrared transmitter and receiver.

4. The personal aid according to claim 1, wherein the electronic assistant includes a plurality of switches controlling operation thereof.

5. A personal aid, comprising:

a handheld housing sized to be readily carried by a user;

the housing including a storage compartment separate and distinct from all electronic components making up the personal aid, the storage compartment consisting essentially of an enclosure shaped and dimensioned for the selective placement of an article therein, wherein the enclosure comprises a recess formed in the housing, the recess consisting essentially of a bottom wall, upstanding side walls and an open top, and a closure positioned adjacent the enclosure for selectively covering the enclosure so as to maintain an article therein;

an electronic assistant integrated with the housing, the electronic assistant being linked to a smart card holder in which a smart card is positioned to provide functionality to the electronic assistant; and further including a container shaped and dimensioned for receipt within the storage compartment selectively positioned within the storage compartment.

6. The personal aid according to claim 5, wherein the electronic assistant includes means for providing a light.

7. The personal aid according to claim 5, wherein the electronic assistant includes an infrared transmitter and receiver.

8. The personal aid according to claim 5, wherein the smart card holder includes a cover.

9. The personal aid according to claim 5, wherein the electronic assistant includes a plurality of switches controlling operation thereof.

10. The personal aid according to claim 9, wherein the electronic assistant includes four switches.

11. A personal aid, comprising:

a handheld housing sized to be readily carried by a user;

the housing including a storage compartment separate and distinct from all electronic components making up the personal aid, the storage compartment consisting essentially of an enclosure shaped and dimensioned for the selective placement of an article therein, wherein the enclosure comprises a recess formed in the housing, the recess consisting essentially of a bottom wall, upstanding side walls and an open top, and a closure positioned adjacent the enclosure for selectively covering the enclosure so as to maintain an article therein;

an electronic assistant integrated with the housing, the electronic assistant being linked to a smart card holder in which a smart card is positioned to provide functionality to the electronic assistant; and further including a speaker positioned within the housing and coupled to the electronic assistant, wherein the electronic assistant include means for driving speaker.

12. The personal aid according to claim 11, wherein the electronic assistant includes means for providing a light.

13. The personal aid according to claim 11, wherein the electronic assistant includes an infrared transmitter and receiver.

14. The personal aid according to claim 11, wherein the electronic assistant includes a plurality of switches controlling operation thereof.

15. The personal aid according to claim 14, wherein the electronic assistant includes four switches.

16. A personal aid, comprising:

a handheld housing sized to be readily carried by a user;

the housing including a storage compartment separate and distinct from all electronic components making up the personal aid, the storage compartment consisting essentially of an enclosure shaped and dimensioned for the selective placement of an article therein, wherein the enclosure comprises a recess formed in the housing, the recess consisting essentially of a bottom wall, upstanding side walls and an open top, and a closure positioned adjacent the enclosure for selectively covering the enclosure so as to maintain an article therein;

a smart card holder formed with the housing;

an electronic assistant integrated with the housing, the electronic assistant being linked to the smart card holder in which a smart card is positioned to provide functionality to the electronic assistant; and wherein the smart card is selectively positioned within the smart card holder and the smart card holder rotates relative to the housing between a secured, closed position and an unsecured, receiving position.

17. The personal aid according to claim 16, wherein the electronic assistant includes means for providing a light.

18. The personal aid according to claim 16, wherein the electronic assistant includes an infrared transmitter and receiver.

19. The personal aid according to claim 16, wherein the smart holder includes a cover.

20. The personal aid according to claim 16, wherein the electronic assistant includes a plurality of switches controlling operation thereof.

* * * * *